Figure 1:
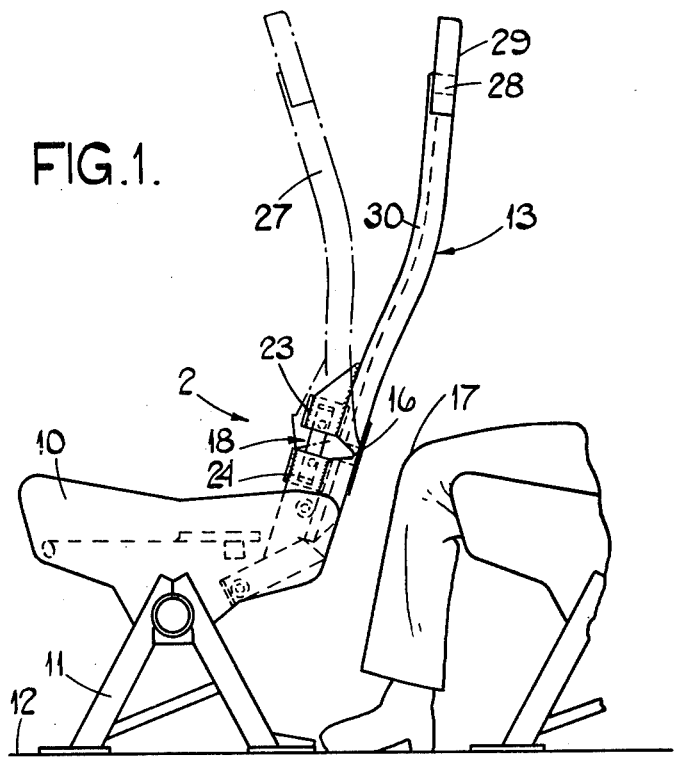

United States Patent [19]

Withers

[11] 4,145,081
[45] Mar. 20, 1979

[54] VEHICLE SEAT

[75] Inventor: Leslie G. Withers, Warley, England

[73] Assignee: TI Accles & Pollock Limited, West Midlands, England

[21] Appl. No.: 861,020

[22] Filed: Dec. 15, 1977

[30] Foreign Application Priority Data

Dec. 22, 1976 [GB] United Kingdom .............. 53628/76

[51] Int. Cl.² .............................................. B60R 21/10
[52] U.S. Cl. .................................................... 297/216
[58] Field of Search ........................ 297/216, 354, 378

[56] References Cited
U.S. PATENT DOCUMENTS

| | | | |
|---|---|---|---|
| 3,501,200 | 3/1970 | Ohta | 297/216 X |
| 3,544,164 | 12/1970 | Ohta | 297/216 X |
| 3,669,397 | 6/1972 | Lemire | 297/216 X |
| 3,724,603 | 4/1973 | Shiomi et al. | 297/216 X |
| 3,734,562 | 5/1973 | Fourrey | 297/216 |
| 3,761,125 | 9/1973 | Glance et al. | 297/216 |

Primary Examiner—James C. Mitchell

[57] ABSTRACT

The invention relates to a vehicle seat which has a seat portion and a back portion connected at its lower end to the seat portion. The back portion has a frame including two laterally spaced side members which each have two portions, namely an upper portion and a lower portion, which are hingedly connected together about a hinge axis disposed generally at about the knee height of a person sitting behind said seat in another, similar, seat. Each side member of said back portion has an energy absorbing device which is connected between said upper and lower portions of the member so as to be capable of absorbing energy in the event of an impact being applied to the upper portion of said seat back portion by a person thrown forwardly from the rear in a manner such that said upper portion of the back portion turns or tends to turn about said hinge axis relative to said lower portion of the seat back portion.

7 Claims, 3 Drawing Figures

U.S. Patent

Mar. 20, 1979

4,145,081

VEHICLE SEAT

This invention relates to a vehicle seat which is especially, but not exclusively, intended for use in a bus or coach. The object of the invention is to provide an improved seat which is capable of absorbing efficiently the impact energy of a person thrown forwardly on to the back of the seat from behind in the event of the vehicle in which the seat is mounted being involved in a collision.

In accordance with one aspect of the present invention, there is provided a vehicle seat having a seat portion and a back portion which is connected at its lower end to the seat portion, said back portion having a frame which includes a pair of side members each having portions which are hingedly connected together on a horizontal hinge axis which is disposed above said seat portion so as to be generally at about the knee height of a person sitting behind the vehicle seat in another similar seat, each of said side members being provided with an energy absorbing device which is connected to the associated side member and which is arranged to absorb energy in the event of an impact being applied to the upper part of the rear of the back portion in such a manner as to turn or tend to turn said upper part of the back portion about said horizontal hinge axis.

Each of said energy-absorbing devices may comprise an endless band which is made of a plastically deformable material and which is connected to the associated side member of the back portion by two connections which are disposed respectively on opposite sides of said horizontal hinge axis and which are also disposed respectively on opposite sides of said endless band, the arrangement being such that in the event of an impact being applied to the upper part of the associated side member which turns or tends to turn said upper part relative to the lower part of the side member about the hinge axis, said connections between the endless band and the side member will impart or tend to impart a rolling motion to the endless band which will absorb the energy of the impact by a plastic deformation of the band.

Furthermore, each of said energy absorbing devices may be connected to the associated side member of the back portion so as to be disposed in front of or behind said side member.

The back portion of the seat may include panel means which are so arranged that a part of said means extends above the top of said back portion frame, said part being deformable and also capable of absorbing energy in the event of an impact being applied to it from above or from the rear. Below said part of the panel means which projects above the top of the back portion frame, the panel means may comprise one or more panels which are of generally channel-shaped configuration in section and which are connected to the frame of said back portion along the outer longitudinal edges of the sides of the channel.

Figure 2:
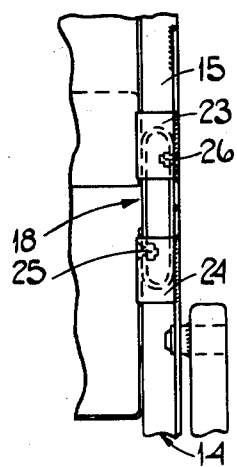
Figure 3:
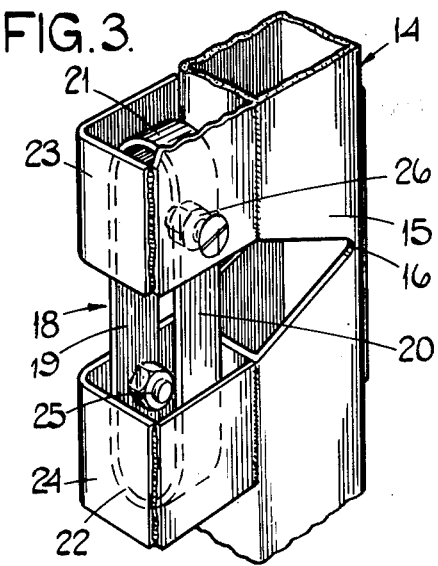

The invention will now be more particularly described with reference to the accompanying drawing wherein FIG. 1 is a side view of one example of a vehicle seat constructed in accordance with the invention, the figure also showing part of a person sitting at the rear in another, similar seat, FIG. 2 is a fragmentary front view, on a larger scale showing one of the energy-absorbing devices incorporated in the seat shown in FIG. 1; and FIG. 3 is a fragmentary perspective view of part of the frame of the seat back portion together with an associated energy-absorbing device.

In the example of a vehicle seat constructed in accordance with the invention and shown in the drawing the seat is intended for use in a bus or coach although it is to be understood that a seat in accordance with the invention can be used in other vehicles as well.

In the example now described the vehicle seat has a seat portion 10 which conveniently includes an upholstered seat frame mounted on a pedestal or other support 11 which in use would be secured to the floor 12 of the vehicle. There is also provided a back portion 13 which is rigidly connected at its lower end to said seat portion 10, the back portion 13 including a frame 14 having a pair of spaced parallel side members which may be of tubular form, one of such side members 15 being shown in FIGS. 2 and 3. Thus said side members may be formed from tubing of rectangular, square or other cross-section.

The aforementioned side members of the frame 14 of the back portion 13 are each locally weakened (as for example by cutting a V-shaped recess in the side member tube) at a position which is disposed above the seat portion, the two locally weakened positions being aligned with each other to form a horizontally extending hinge axis (which extends through the inner ends 16 of said V-shaped recesses) and the disposition of said hinge axis is arranged so that it will be generally at about the height of the knees 17 of a person sitting behind the aforesaid vehicle seat in another similar seat as indicated in FIG. 1. The aforementioned locally weakened portions of the side members of the back portion frame thus divide in effect said back portion into an upper part and an integrally connected lower part. It is also to be understood that such upper and lower parts could be provided if desired by parts which are separately formed and then hingedly connected together in any convenient manner.

There is also provided, in association with each side member of the back portion frame, an energy absorbing device in the form of an endless band 18 which is formed of a plastically deformable material such as steel. Each endless band 18 is of generally flattened form so that it has a pair of opposed straight portions 19 and 20 which are integrally connected by a pair of oppositely disposed curved portions 21 and 22. Each of said devices is disposed either in front of or behind the associated back portion side member so as to be spaced from the hinge axis thereof and the band is connected by means of brackets 23 and 24 and nut and bolt connections 25 and 26 to both the upper and lower parts of said side member. Thus in the case where the side member is locally weakened as shown in FIG. 3 said endless band would be connected to the side member at positions above and below the locally weakened portion. Furthermore said connections 25 and 26 are disposed on opposite sides of the endless band 18 so that one connection, namely connection 25 is made to one of the straight portions 19 of the band and the other connection 26 is made to the other straight portion 20 of the band.

If now an impact is applied to the rear of the upper part of said back portion 13 of the seat, said upper parts of the two side members 15 of said back portion frame will tend to pivot forwardly on said hinge axis 16 and such pivotal movement will have the effect of displacing the aforesaid connections 25 and 26 to the endless band 18 relative to each other in such a way as to tend to roll said band in a plastically deformable manner. Such plastic deformation of the band will absorb the energy of the impact. It is of course apparent that other forms of energy absorbing devices may be used instead of the pair of endless bands 18 as referred to above but in any event the aforesaid hinge axis 16 between the upper and lower parts of the back portion of the seat is arranged, as previously mentioned, at approximately knee height so that in the event of the vehicle in which the seat is mounted being involved in a collision such as will cause a person sitting behind the vehicle seat being thrown forwardly, the knees 17 of such person (which will usually be the first of such person to impinge on the back portion 13 of the seat in front) will engage such back portion of the seat in front on or close to said hinge axis 16 and will thus only exert a minimum turning moment on the upper part of the back portion. Thus, said hinge axis 16 may be slightly above the height of knee impingement so that such impingement will not exert any forward turning moment on the upper part of said back portion 13; alternatively the hinge axis may be arranged to be slightly below the height of knee impingement provided that any turning moment applied by knee impingement is within the energy absorbing capacity of said energy absorbing devices 18. If then the upper part of the body (not shown) of such person pivots forwardly so as to engage the upper part of said back portion 13 of the seat in front then said back portion will not have been previously collapsed and will be able to collapse in an energy absorbing manner under the control of the aforementioned energy absorbing devices 18 to a position indicated for example in broken outline by reference numeral 27 in FIG. 1 and the injury to said person will thus be minimized.

Further protection for a person sitting behind the above described vehicle seat in another, similar seat is obtained by arranging that the frame 14 of the back portion 13 of the seat does not extend to the upper edge of said back portion. Thus said frame may include a top rail 28 which is connected to the lower end of a panel 29 which projects upwardly above the top rail and which will bend forwardly relative to said top rail in an energy absorbing manner if it is struck from the rear by an object such as the head of a person sitting behind. Furthermore between the two side members 15 of the frame 14 of the back portion of the seat there is provided one or more panels 30 which are of generally channel-shaped configuration in cross-section and the or each of these panels is connected to said side members 15 by securing the latter to the free edges of the sides of said channel-shaped panels. Such an arrangement provides an additional safety feature in that if such panel or panels is or are struck by the body of a person sitting behind then the channel-shaped configuration of the cross-section will provide some "give" which will enable the base portions of the panels to move forward between the side members 15 of the back portion frame 14 and thereby again minimize the damage to the person sitting behind. It is of course to be understood that the whole of the back portion of the seat including the frame 14, the two energy absorbing devices 18, the extension 29 projecting above the top rail, and the panel or panels 30 extending between the side members of the frame will be suitably upholstered.

I claim:

1. A vehicle seat having a seat portion and a back portion which is rigidly connected at its lower end to the seat portion, said back portion having a frame which includes a pair of side members, each side member having an upper part and a lower part which are hingedly connected together on a horizontal hinge axis which is disposed above said seat portion so as to be generally at about the knee height of a person sitting behind the vehicle seat in another similar seat, each of said side members being provided with an energy absorbing device which is connected to the associated side member and which is arranged to absorb energy in the event of an impact being applied to the upper part of the rear of the back portion in such a manner as to turn or tend to turn said upper part of the back portion about said horizontal hinge axis.

2. A vehicle seat as claimed in claim 1 wherein each of said energy-absorbing devices comprises an endless band which is made of a plastically deformable material and which is connected to the associated side member of the back portion by two connections which are disposed respectively on opposite sides of said horizontal hinge axis and which are also disposed respectively on opposite sides of said endless band, the arrangement being such that in the event of an impact being applied to the upper part of the associated side member which turns or tends to turn said upper part relative to the lower part of the side member about the hinge axis, said connections between the endless band and the side member will impart or tend to impart a rolling motion to the endless band which will abosrb the energy of the impact by a plastic deformation of the band.

3. A vehicle seat as claimed in claim 2 wherein each of said endless bands comprises a pair of opposed straight portions which are integrally connected by a pair of oppositely disposed curved portions.

4. A vehicle seat as claimed in claim 2 wherein each back portion side member is provided both above and below said horizontal hinge axis with a bracket, said connections between said endless band and the side member being made via said brackets.

5. A vehicle seat as claimed in claim 1 wherein the back portion of the seat includes panel means which is arranged so that a part of said means extends above the top of the back portion frame.

6. A vehicle seat as claimed in claim 1 wherein said back portion of the seat has further panel means which extends between the sides of said back portion frame and which is deformable in the event of an impact being applied from the rear.

7. The vehicle seat as claimed in claim 1 wherein the lower end of the lower member is connected rigidly to said seat portion and extends upwardly to a height generally at about the knee height of the person sitting behind the vehicle seat, the upper end of said lower member is hingedly connected to the lower end of said upper member so that said upper member is bendable forwardly over said seat portion and the energy absorbing means is connected between said upper and lower members to maintain said lower and upper members axially aligned during normal use and being bendable thereon in response to a force exerted by collision of said vehicle.

* * * * *